May 25, 1965　　　F. VENUS, JR　　　3,185,356
METERING VALVE
Filed March 27, 1962　　　3 Sheets-Sheet 1
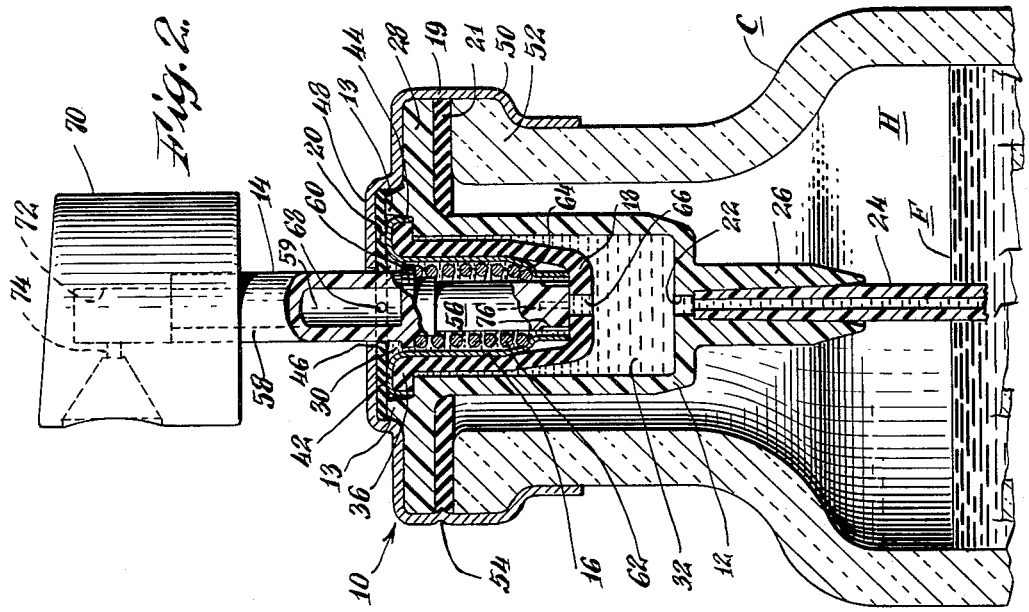
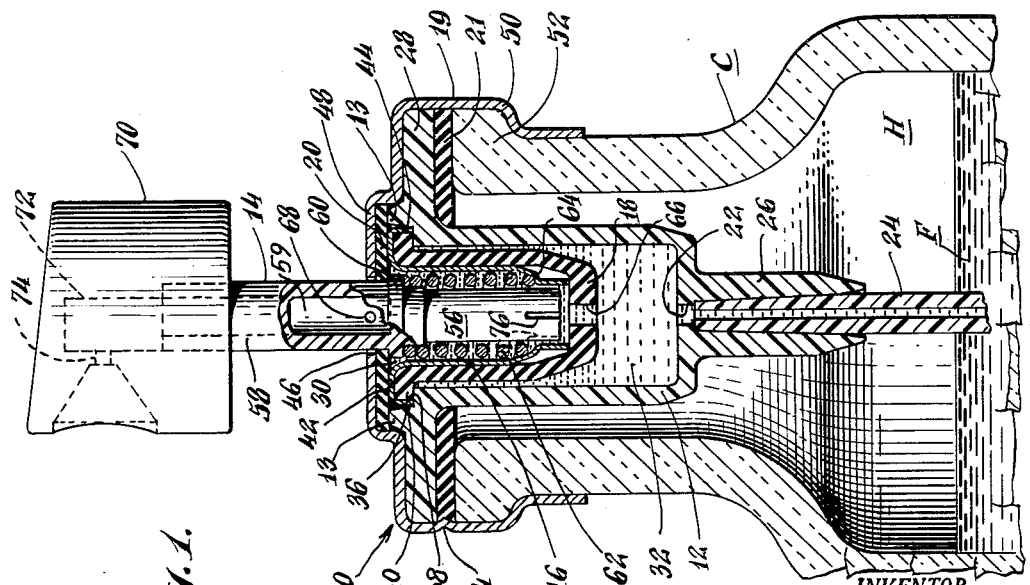
INVENTOR.
Frank Venus, Jr.
BY Steward & Steward
his ATTORNEYS.

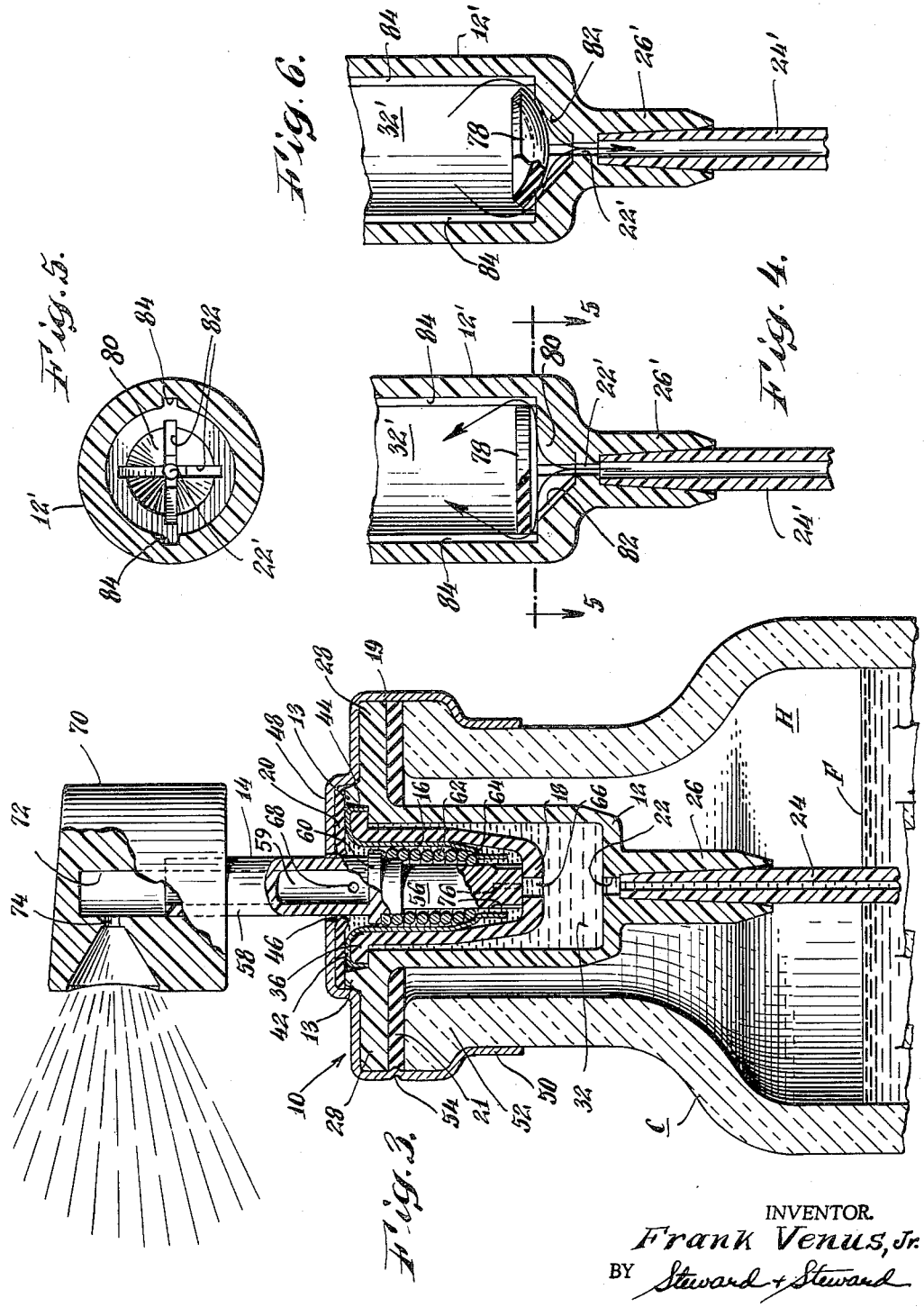

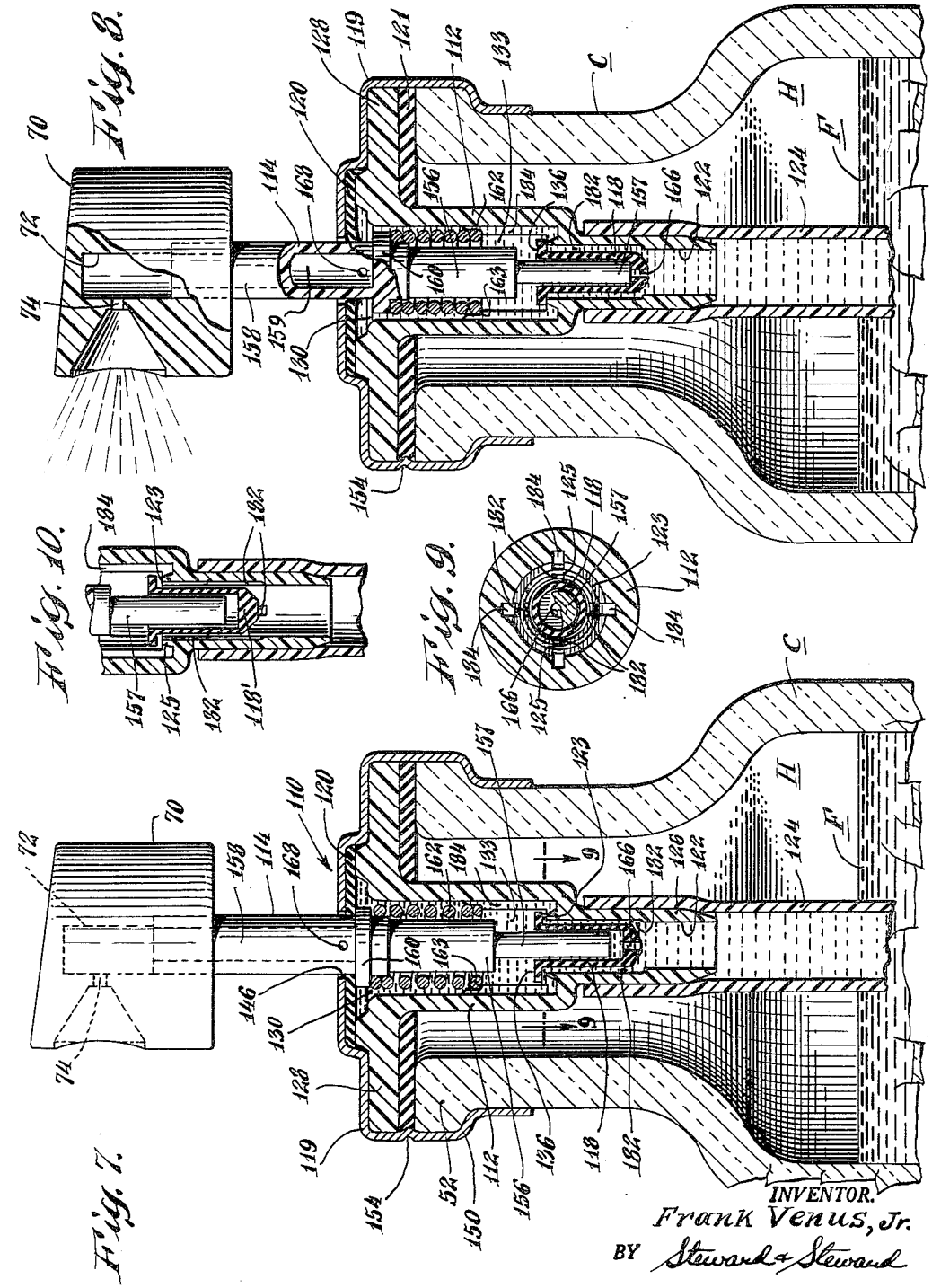

United States Patent Office 3,185,356
Patented May 25, 1965

3,185,356
METERING VALVE
Frank Venus, Jr., Wilmington, Mass., assignor to The Risdon Manufacturing Company, Naugatuck, Conn., a corporation of Connecticut
Filed Mar. 27, 1962, Ser. No. 182,793
11 Claims. (Cl. 222—394)

This invention pertains to metering valves for use in connection with self-pressurized packages of fluid products. As is typical of valves of this type, those disclosed herein are designed to dispense a uniform or metered volume of fluid product from a pressurized container each time the valve is manually operated.

Metering valves are used extensively in many of the familiar aerosol packages in which a great variety of fluid products are commercially available today. These metering valves help the customer to dispense the proper amount of a product and to avoid waste. Controlled dispensing is especially important in drug and pharmaceutical products since these are normally expensive and in any event must generally be administered in measured dosages for reasons of effective medication or safety.

There are a number of conflicting objectives which constantly confront designers and manufacturers of these valves, and principal among these is the provision of valves which are thoroughly reliable and uniform in operation, yet are of such nominal cost as to make the "throw-away" container and valve method of packaging economically practical. The design and construction of the valves of this invention make possible the better achievement of these conflicting objectives and afford important commercial and manufacturing advantages over existing types of aerosol metering valves.

The basic operating principle of conventional aerosol metering valves involves fundamentally the provision of a valve assembly having a fluid metering or measuring chamber, usually formed by a portion of the valve cup or housing. Such chamber is formed with an inlet which normally is in open communication with the interior of a container in which the valve assembly is fitted, so that fluid aerosol product from a main body or supply of the same in the container will enter into the metering chamber of the valve under the pressure of a low-boiling gas propellant admixed with the product. Such chamber also has an outlet from which the product is eventually released to atmosphere, but which in the normal, non-dispensing condition of the valve assembly is closed by an operating member and associated seal. Practically all aerosol metering valves in commercial use today incorporate a reciprocable core or stem having a dispensing port and fluid outlet passage associated therewith. This stem is mounted for reciprocation in the measuring chamber, and the aforesaid seal peripherally grips the stem at the outlet of the metering chamber to prevent escape of the product from the chamber. However, upon manually pressing the stem, the latter is slid relative to the outlet seal until the dispensing port is brought into a position beneath the seal, thus by-passing the seal and allowing the contents of the metering chamber to flow out under its own pressure into the fluid passage of the stem. In the course of moving or sliding the stem to the dispensing position just described, the inlet to the metering chamber is closed, which closing is arranged to occur before the by-passing of the outlet seal by the dispensing port in the stem occurs. Otherwise, of course, product within the main body of the container would continue to enter the metering chamber and prevent any accurate automatic control of the amount dispensed on each actuation of the stem.

In order to achieve the timed sequence of inlet-closing, outlet-opening operation, it is necessary that a certain amount of travel of the stem be permitted to occur after the inlet has been closed. This is commonly referred to as over-travel and various schemes have been proposed to accomplish this. In one form of commercial metering valve, this over-travel is provided by the compression of a resilient plug disposed in the inlet end of the metering chamber. In another form of valve, the stem extends inwardly into the metering chamber inlet and, when the stem is depressed the inlet is closed by peripheral contact of the inner length of the stem with a resilient annular seat surrounding the inlet port. These prior constructions have exhibited certain inherent disadvantages which are troublesome in a mass-produced, low-cost item such as here under consideration. For example, the compressible plug arrangement is somewhat limited in respect to the amount of over-travel which can effectively be obtained, while the other type of valve mentioned is troubled by swelling of the annular inlet seal as a result of prolonged contact with the fluid product in the course of normal storage, with resulting difficulties in obtaining a proper seal.

The metering valve constructions herein disclosed eliminate these disadvantages and afford other advantages not found in prior types. In general, the novel valve assemblies comprise a distendable elastic bag or thimble-shaped member which is employed to control the entrance of fluid product at the inlet of the metering chamber. Normally, that is in the non-dispensing condition of the valve, the metering chamber inlet is open and fluid product rises into the chamber, filling it. However, upon actuation of the valve stem to effect the dispensing of the product, inward travel of the stem stretches or distends this thimble member by contact therewith and closes off the chamber inlet in the course of this stretching or distending action.

One of the chief advantages of this construction is that the stretching of the bag allows for a very substantial amount of over-travel of the stem, yet any swelling that will probably inevitably occur in this elastic member is immaterial to its operation in closing the inlet to the metering chamber. The tolerances which must be maintained in the manufacture of the valves are accordingly much less critical.

Another important feature of the novel valves is that all travel of the stem which occurs in the course of its operation is accomplished without varying the effective metering chamber capacity. Thus, the metering chamber need not provide space for stem over-travel, and it is possible through this arrangement to make a metering chamber of very small measuring capacity, which is desirable in certain applications.

Rapid pressure filling, that is, charging a preassembled container and valve with product and propellant by introducing the latter under pressure through the valve itself, is likewise facilitated by the valve constructions of this invention.

The invention is illustrated by several specific constructions shown in the accompanying drawings, wherein—

FIG. 1 is a view in side elevation, partly in section, of a metering valve assembly embodying the novel concept herein disclosed, the valve assembly being equipped with a conventional actuator or spray button and being mounted in the neck of a container, the valve being shown in non-dispensing condition.

FIG. 2 is a view similar to FIG. 1 but with the valve actuated to an intermediate position;

FIG. 3 is similar to FIG. 1 but showing the valve in dispensing condition;

FIG. 4 is partial view in side elevation of a modification of the valve assembly shown in FIGS. 1 to 3;

FIG. 5 is a cross sectional view taken on line 5—5 of FIG. 4.

FIG. 6 is a partial view in side elevation similar to that of FIG. 4 but showing parts thereof in a different position;

FIG. 7 is a view in side elevation, partly in section, of another form of metering valve coming within the scope of this invention, the valve assembly having a conventional actuator button and being mounted in a container, the valve being shown in non-dispensing condition;

FIG. 8 is a view in side elevation similar to that of FIG. 7, wherein the valve assembly is shown in dispensing condition;

FIG. 9 is a sectional view taken on line 9—9 of FIG. 7; and

FIG. 10 is a fragmentary view in section of still another form of the valve.

Referring to FIGS. 1, 2, and 3, a valve assembly embodying the features of the invention is illustrated. The valve assembly shown is secured to a container within which a main supply of aerosol liquid is adapted to be held. The illustration here depicts a glass container but this is immaterial to the invention which is equally adaptable to metal or plastic containers since appropriate revision of the supporting ferrule or mounting flange of the valve assembly can readily be made to adapt the valve assembly for use in such other types of containers, all as well known in the art. The over-all valve assembly, designated at 10, is comprised of a valve cup or outer housing 12, a core or stem 14, a substantially rigid sleeve or inner housing 16, a resilient thimble-shaped member 18, a mounting flange or ferrule 19 and sealing gaskets 20 and 21, as the principal components of the assembly.

Valve cup 12 is provided with an inlet 22. A dip tube 24 is secured in the socket of tailpiece 26 so as to provide communication between the inlet 22 of the valve cup and the main body of aerosol fluid F in the container C.

In addition, valve cup 12 is formed adjacent its upper or outer end with an external mounting flange 28. This flange is adapted to overlie the lip at the mouth of the container and to rest upon sealing gasket 21 thereat, whereby the cup is supported in the mouth of the container. Valve cup 12 is open at its upper end to provide outlet 30. Intermediate the inlet 22 and the outlet 30, the valve cup forms a reservoir 32 for fluid product entering through dip tube 24.

Escape of the fluid from outlet 30 is normally prevented by valve core or stem 14 and the annular grommet 20. There is, in addition, a second seal at the outlet end of valve cup 12, which is formed by an external flange 36 on the upper end of resilient thimble member 18. The margin of this flange 36 overlies shoulder 38 formed by a counterbore 40 in the valve cup. Thimble 18 is thus suspended substantially concentrically within valve cup 12 by its aforesaid flange 36, and is clamped to the shoulder 38 in a manner now to be described.

The aforesaid clamping engagement of thimble 18 to valve cup 12 is provided by the superpositioning of a conforming external flange 42 of rigid sleeve 16 which is received in telescoping relation generally concentrically of the thimble. Flange 42 is further provided with a reversely or downwardly directed rim 44 whose axial extent limits the amount of compression permitted to be imparted to the resilient material of flange 36 of thimble member 18. Compression of the seal members 20 and 36 to form a fluid-tight closure at the outlet 30 of the valve cup is supplied by ferrule 19. This member is a thin-gauge metal stamping of generally annular configuration having a center aperture 46 through which core 14 extends, and having a central raised dome 48 surrounding aperture 46, within which seal 20 is retained. Ferrule 19 is further provided with a lateral skirt 50, the lower or terminal portion of which is adapted to be rolled or squeezed into gripping engagement with the mouth of the container C below the shoulder or lip 52 thereof when the valve assembly is ultimately secured to a container.

Gasket or seal 21, which may either be a separate annular grommet or simply resilient material applied to the under surface of valve cup flange 28, is disposed between the lip of the container mouth and the valve cup. Prior to mounting the valve assembly 10 on a container it is desirable to hold the several components in their assembled position, and to this end rim 50 of ferrule 19 is staked about its periphery, as shown at 54, for example. These indentations or staking points 54 are disposed beneath flange 28 of the valve cup and grommet 21 and thus serve to compress grommet 20 between the inner wall of dome 48 and a circular ridge 13 in the upper surface of flange 28. At the same time, clamping of lip 36 of the thimble member as above described is also accomplished.

Core 14 consists of a generally cylindrical member comprising a valve stem for operation of the valve assembly to permit dispensing of fluid product. This core is located concentrically of and in telescoping relation to the thimble and several housing members 12 and 16, and has an inner length 56 which is positioned within the housing members and is separated from an outer length 58 disposed externally of the housing members by an enlargement or shoulder 60. At its under surface, shoulder 60 forms an abutment for compression spring 62, the opposite end of which is supported by a ledge 64 formed by constricting the inner end of sleeve or housing 16. The lower or inner end of sleeve 16 is open to provide an inlet for the fluid product and also to receive and guide the inner end of core 14. Under the urging of spring 62, core 14 is normally urged upwardly or outwardly as viewed in FIG. 1 so that the upper surface of its shoulder 60 is compressed against and makes sealing contact with the under surface of outlet seal 20.

Ingress of fluid from reservoir 32 of the valve cup to the interior of thimble 18 and sleeve 16 is provided by an aperture or port 66 in the bottom wall of the thimble. This port is in axial alignment with the inner end of core 14. In the core position illustrated in FIG. 1 of the drawings, however, escape of fluid from the interior of sleeve 16 is prevented by seal 20.

The outer length 58 of core 14 is hollow. Spaced slightly above shoulder 60 is a discharge port 68 extending laterally through the wall into communication with the discharge passage 59 formed by the hollow core. Port 68 is located above the outlet seal 20 when the valve stem is disposed in the normal, non-dispensing position illustrated in FIG. 1. For convenience in operating the valve and for providing a final discharge orifice giving a desired type of spray pattern, an actuator body 70 is mounted on the upper end of the valve stem. This body is provided with a socket for the reception of the upper end of the valve core, and internal passage 72 in actuator 70 provides communication with spray nozzle 74.

Manual depression of the valve core by finger pressure on actuator 70 causes core 14 to move downward against the urging of spring 62. As seen in FIG. 2, the respective axial lengths of inner portion 56 of core 14, sleeve 16 and resilient thimble 18 are so arranged that prior to movement of discharge port 68 beneath seal 20, the inner end of core 14 engages the end wall of the resilient thimble member and closes off the port 66 therein. Thereafter, further inward movement of the plunger is permitted by distention of thimble 18 to allow discharge port 68 to move beneath seal 20, thus by-passing the seal and allowing fluid trapped in the metering chamber formed by thimble 18 to escape through the discharge port to atmosphere through spray nozzle 74 in actuator 70. (See FIG. 3.) Since communication between the fluid in reservoir 32 and thus with the main body in the container is interrupted by closing of inlet 66 to the metering chamber, only fluid which is contained in the aforesaid metering chamber may escape to atmosphere.

When the plunger is released, it is returned to its starting position by the action of spring 62. In the course of this, discharge port 68 is first moved out of communication with the interior of the metering chamber so that it no longer by-passes seal 20. Thereafter, the lower tip of core 14 moves away from and out of contact with the end of thimble 18, reopening port 66 and re-establishing fluid communication between the interior of the metering chamber and the recharging supply in reservoir 32 and the main supply in container C.

While it is not essential, it is preferred that the construction of thimble 18 and sleeve 16 be such that in the normal, non-dispensing condition of the valve (see FIG. 1), the lower end wall of thimble 18 abut against the open end of sleeve 16. Such abutment provides a more positive location of the end wall of thimble 18 with respect to the tip of the core 14. In fact thimble 18 may be designed when first assembled with sleeve 16 in valve 10 to be placed under a slight stretching stress. In this manner, any swelling or dimensional change occurring in the resilient material of thimble 18 due to prolonged contact with the fluid product is nullified. Thus a rigid liner or housing, such as sleeve 16, for resilient thimble 18 serves to provide more accurate volumetric metering by the valve assembly. It is, however, not essential to an operative embodiment of the valve.

In order to insure rapid and free flow of fluid from reservoir 32 into the interior of sleeve 16 in the non-dispensing position of the core 14, the inner end of the core is routed or grooved at circumferentially spaced points to provide flow channels 76 extending axially from the lower tip of the core to a point somewhat above shoulder 64 of sleeve 16. Thus if the clearance between the inner end 56 of core 14 and the necked or constricted inner end of sleeve 16 is small, as is desired in order to maintain vertical stability of the core, passage of fluid from reservoir 32 upwardly through inlet port 66 into the interior of sleeve 16 is facilitated. Again this is an optional but not essential feature of the invention.

A modified form of valve housing is illustrated in FIGS. 4 to 6, in which a check valve is incorporated in addition to the metering components of the valve assembly shown in FIGS. 1 to 3. In these figures, the valve housing 12' is generally similar to the previously described housing 12, but the bottom of auxiliary reservoir 32' is provided with a frusto-conical depression 80 and a flexible check disk 78 overlying this depression. The latter merges with the inlet passage 22' in the bottom of valve housing 12', and check disk 78 has a diameter sufficiently greater than the maximum diameter of depression 80 so that it normally covers the fluid inlet. Disk 78 merely rests of its own weight in the bottom of the reservoir. Depression 80 is provided with four grooves 82 which lead radially from the inlet 22' to the inner surface of the bottom wall of valve cup 12' for a purpose to be explained presently, and valve disk 78 also covers the upper terminal ends of grooves 82 under normal conditions, as shown more particularly in FIG. 4. Valve housing 12' is further provided with axially extending lateral grooves 84 in its side wall.

In the normal, non-actuated condition of valve 10, fluid F from the main supply thereof in container C is free to pass upwardly into auxiliary reservoir 32', under the influence of the propellant pressure in the head space H above the fluid in the container. Fluid entering through dip tube 24' and inlet 22' causes upward displacement of check disk 78 (see flow arrows in FIG. 4), in flowing into reservoir 32'. Once this reservoir is filled, disk 78 acts as a check to prevent gravity flow of the fluid back through the inlet to the main body F when pressure equilibrium between the main body of fluid in the container and that in valve housing 12' is attained. Thus valve 10 is kept primed in this manner.

One of the important features of the valves of this invention is that they are readily adapted to pressure filling. As is well understood by those in the art, this term refers to the method of filling a container with the propellant, or both propellant and product, after the valve assembly has been permanently secured in the mouth of the container. In this pressure filling operation, fluid is forced backward through the valve assembly into the container. In the valve shown in FIGS. 1 to 3, the flow may take either or both of two different routes. If the pressure filling head is of the type that fills only through the valve core, then the flow will be inwardly through the hollow portion 58 of core 14 (actuating button 70 will not have been attached at this time), and the core must be pressed substantially to the FIG. 3 position so that discharge port 68 is brought beneath seal 20. Fluid enters sleeve 16 and passes downwardly through its open lower end around the inner end 56 of core 14. The fluid is temporarily stopped by thimble 18 since port 66 is closed under these circumstances by the inner end of core 14, but the filling pressure applied is made sufficient to stretch thimble 18 and thus displace it from core 14. The fluid then passes inwardly through inlet 66 into reservoir 32 and then of course into container C. In this operation, thimble 18 acts as a check valve which closes immediately upon discontinuance of the filling pressure.

If the pressure filling method employed is that which also forces fluid around the exterior of the valve stem or core, through the clearance provided between the exterior of the core 14 and the aperture 46 in mounting ferrule 19, again depressing core 14 to the position shown in FIG. 3 is necessary. In this instance, fluid entering the valve assembly will not only flow in through the hollow portion 58 of core 14 but will also pass downwardly around the outside of the core causing an inward deflection of the margin of the aperture of seal 20. The path of flow is thereafter the same as before.

While check disk 78 is capable of preventing the normal gravity return of fluid from reservoir 32 to the main body F within the container C, it does not interfere with the pressure filling operation hereinabove described. FIG. 6 of the drawings illustrates the condition of the check disk during pressure filling. As there seen, check disk 78 is deflected downwardly at its center by the pressure of the incoming fluid. This is introduced at a considerably higher pressure than that to which the aerosol package will ultimately be charged. Deflection of disk 78 causes its periphery to be lifted upwardly, exposing the upper ends of channels 82 in the depression 80 of valve housing 12'. The entering fluid is thus free to pass inwardly around disk 78 into channels 82 and inlet 22', and then into dip tube 24' as already described.

Check disk 78 may be formed of suitably resilient plastic, such as nylon or polyethylene, which, in conjunction with the thickness selected, will provide the necessary flexing of the disk under pressure filling conditions as above described. The use of the check disk is optional and not essential to the operativeness of the metering valve itself.

A further embodiment of the invention is illustrated in FIGS. 7 and 8 which in many respects closely resembles the construction shown in FIGS. 1 and 3 but which incorporates specific differences which will now be discussed.

The valve construction, indicated at 110, illustrated in FIGS. 6 and 7 again comprises a valve housing 112 and a valve core 114 adapted for vertical reciprocation in telescoping relation within housing 112. This assembly also includes a resilient thimble member 118 which cooperates with core 114 and an outlet seal 120 in controlling the release of aerosol fluid F from container C in which the valve assembly is mounted. As in the previous example, housing 112 is supported in the neck or mouth of container C by an integral external mounting flange 128 which overlies lip 52 of the container and sealing gasket 121, and which is clamped to the mouth of the container by crimping or rolling the skirt 150 of mounting ferrule 119 about the neck of the container below the lip thereof. Ferrule 119 is provided with a central aperture 146 through which the upper end 158 of core 114 projects. This outer length of the core is hollow forming a discharge passage 159, and is adapted to receive a conventional actuator button 70, all as in the previous example. Also, a discharge port 168 through the wall of core 114 above its shoulder 169 provides communication to the discharge passage of core 114.

Core 114 has an enlargement forming a shoulder 169 intermediate its ends, which shoulder is normally held in upward abutment against the under surface of the annular outlet seal 120 by compression spring 162. The latter is confined between the under surface of shoulder 169 and a ledge 163 formed by a counterbore in the inner wall of housing 112.

Valve housing 112 is provided with an inlet 122 in its bottom wall, which extends longitudinally through a projecting integral tailpiece 126 which serves as a nipple for securing dip tube 124. The dip tube of course extends downwardly from the valve assembly into the main body of fluid F and terminates closely adjacent the bottom of container C in conventional manner. Surrounding inlet 122 where it opens into housing 112 there is formed a horizontal annular valve seat 123, as seen best in FIG. 9. Longitudinally extending feed channels 184 are formed in the inner wall of the counterbored portion of housing 112 and extend somewhat below the inlet valve seat 123. A pair of flow channels 182 is also formed in the wall of inlet 122 in tailpiece 126, which grooves 182 extend from the surface of valve seat 123 to a point about midway of the length of tailpiece 126. As seen in FIGS. 7 through 9, grooves 182 and 184 do not interconnect directly, being interrupted by a narrow wall 125 at the valve seat 123.

A thimble 118 is formed of rubber, neoprene or other suitable elastic material and is disposed in inverted position telescopically within inlet 122 of the valve housing. The body of thimble 118 has an external diameter which gives the body a loose sliding fit in inlet 122. At its upper end, thimble 118 is provided with an external annular flange 136 whose outer diameter is slightly less than the adjacent inner diameter of housing 112. Flange 136 is thus adapted and arranged to overlie inlet valve seat 123 and to form a seal thereat under conditions which will be described presently. Normally, however, thimble 118, in the non-dispensing condition of the valve assembly as illustrated in FIG. 7, is free to be displaced axially upward by fluid entering through dip tube 124 in order to allow such fluid to pass into the chamber 133 formed by the interior of valve housing 112. In this instance, thimble 118 is illustrated as having an inlet port 166 in its end wall through which fluid may also enter in passing into the interior of the valve housing.

The inner end of valve core 114 is provided with a cylindrical extension 157 of a diameter adapted to fit loosely within thimble 118. This extension serves not only to maintain thimble 118 in proper relation to the other parts, but also to effect the sealing or closing off of inlet 122 of the valve housing when it is desired to dispense a metered portion of fluid from the container. To this end, the respective lengths of core extension 157 and thimble 118 are so designed that as the actuator button 70 is depressed, the inner end of extension 157 abuts against the bottom or end wall of thimble 118, closing off port 166 and also causing flange 136 at the upper end of the thimble to bear against and form a seal with the inlet valve seat 123. This sealing of the inlet occurs prior to the arrival of discharge port 168 in core 114 at a point where it is in communication with the interior of the valve housing; in other words before discharge port 168 is moved below seal 120. Thereafter, further inward movement of core 114, as permitted by the stretching or elongation of thimble 118, brings discharge port 168 beneath seal 120 and escape of fluid in chamber 133 then occurs to the spray nozzle 74 of the actuator button via the discharge passage provided by the hollow stem portion 158 of core 114. Such extension or stretching of thimble 18 simply produces a tighter seal at inlet seat 123.

Upon discharge of the contents of chamber 133 and subsequent release of actuator button 70, valve core 114 returns to its initial FIG. 7 position under the bias of spring 162. In the course of this return, discharge port 168 is first moved out of communication with the interior of the valve housing, and thereafter release of thimble 118 by extension 157 occurs to permit ingress of additional aerosol fluid to chamber 133.

Valve assembly 110 is also adapted for pressure filling by either of the methods heretofore described. During the filling operation, valve core 114 will be in the position illustrated in FIG. 8 in which, as previously described, the inlet 122 to the interior of the valve housing is normally closed. However, under the influence of the heavy pressure employed during the filling operation, thimble 118 acts only as a check valve in respect to flow inwardly of the container. That is, aerosol fluid being introduced under pressure through and around the valve stem into chamber 133 passes downwardly between the extension 157 of the core and the interior of thimble 118. Further extension or stretching of thimble 118 occurs as a result of this pressure, whereby the entering fluid passes around the tip and inwardly of the container through port 166.

The provision of port 166 in thimble 118 is necessary to permit pressure filling but otherwise may be dispensed with since normal replenishment of chamber 133 after a dispensing cycle will be accomplished simply by flow around the thimble, particularly where the flow channels 182 are provided in the wall of inlet 122 as illustrated. Such an arrangement is shown in FIG. 10, wherein thimble 118′ is imperforate. Various other modifications will also be obvious, especially in respect to the substitution of a metal valve housing and core for the respective plastic components specifically illustrated.

In the valve construction illustrated in FIGS. 1 to 3, the volume of fluid dispensed when the plunger or core 14 is depressed is determined by the size of resilient thimble 18 or rigid inner housing or sleeve 16 within outer housing 12. In the embodiment which is illustrated in FIGS. 7 and 8, the metered volume is determined by the size of the outer housing 112 alone. However, it will be noted that both forms are characterized by the use of a resilient thimble-shaped member which is manually elongated temporarily in controlling the ingress of aerosol fluid to the measuring chamber, such elongation being effected by engagement of the valve core with the inner end wall of the thimble. It is this concept of control in aerosol metering valves which characterizes the present invention and the broader scope of the invention as defined in the claims is intended to be interpreted accordingly.

What is claimed is:

1. A metering valve for self-pressurized aerosol fluid products constituting means for temporarily isolating and discharging a predetermined portion of fluid product from a larger body thereof in a pressurized container, said valve having a housing, means for mounting said housing in the mouth of a container, said housing having an inlet for communication with the interior of the container and having an outlet for the discharge of fluid product from the container, means in combination with said housing for isolating a predetermined portion of aerosol product including a resilient thimble-shaped member disposed concentrically of said housing in telescoping relation thereto, manually actuated means for controlling the release of said predetermined portion of aerosol product and comprising an axially reciprocable core located in said housing outlet and having a discharge port and associated fluid passage, fluid seal means retained by said housing mounting means and surrounding said core at said outlet normally preventing escape of fluid product thereat, means urging said core to non-dispensing position relative to said outlet seal but yieldable upon manual depression of said core to move said discharge port into by-passing position relative to said seal to allow fluid product to escape through said discharge port and core passage to atmosphere, said core having an inner end disposed within said thimble member and normally spaced from the end wall thereof but engageable therewith when said core is depressed, and an inlet port in one of said housing and thimble members which is normally open but which is closed by the aforesaid engagement between said inner core end and said thimble wall prior to arrival of said core discharge port at by-passing position relative to said outlet seal, further inward travel of said core thereafter being permitted by elongation of said thimble member to move said core to said outlet seal by-passing position.

2. A metering valve for self-pressurized aerosol fluid products comprising a housing having an inlet and an outlet, and means for mounting said housing in the mouth of a container, and an elastic thimble-shaped member carried by said housing substantially concentrically therewith and in telescoping relation thereto for isolating a measured portion of aerosol fluid, said thimble member defining a metering chamber and having a normally open inlet communicating with the inlet of said housing member and a normally open outlet concentric with said housing outlet for communicating said chamber to atmosphere, manually actuated means for releasing said fluid from said chamber through said thimble and housing outlets comprising an axially reciprocable core located concentrically in said thimble member, a discharge port and associated fluid passage in said core for discharging to atmosphere fluid released from said chamber when said core is depressed, fluid seal means retained by said housing means and surrounding said core at said thimble and housing outlets and normally preventing escape of fluid product therefrom, means normally urging said core to a non-dispensing position relative to said outlet seal but yieldable upon manual depression of said core to move said discharge port into position to by-pass said seal and allow fluid in said chamber to escape through said core discharge port and passage to atmosphere, said core having an inner portion adapted to engage said thimble member interiorly thereof and close said normally open inlet prior to the arrival of said core discharge port at outlet seal by-passing position, further travel of said core to said last named position being permitted by elastic elongation of said thimble member.

3. A metering valve as defined in claim 2, in which said housing is external to said thimble member, said resilient thimble member being received and retained in said housing outlet and making fluid sealing engagement circumferentially about said housing outlet.

4. A metering valve as defined in claim 3, wherein said housing is formed with a counterbore at its outlet end to provide a recess thereat, and said resilient thimble member has a flange at its outlet end which is received in said recess, said mounting means for said housing serving also to clamp said thimble flange in said housing recess in fluid sealing engagement.

5. A metering valve for self-pressurized aerosol fluid products comprising a tubular housing having a fluid inlet and a fluid outlet at respectively opposite ends and defining a metering chamber, said housing being formed interiorly about its inlet to provide an annular seat, a resilient thimble-shaped member open at one end and having a wall at its other end, an external peripheral flange about the open end of said thimble member, said thimble member being disposed within said housing inlet in loose telescoping relation thereto with its flange overlying said annular seat in said housing, manually actuated means for controlling the entrance and escape of fluid product to and from said metering chamber and comprising a reciprocable core located therein, a discharge port and associated discharge passage means in said core for releasing fluid from said metering chamber when said core is depressed, an annular seal providing a close sliding fit about said core at said housing outlet and normally closing said outlet against discharge of fluid therefrom, means normally urging said core to non-dispensing position but yieldable upon manual depression of said core to move its discharge port into by-passing position beneath said annular outlet seal and permit aerosol fluid in said metering chamber to escape through said discharge port and core passage, said core having an inner portion adapted to fit within said thimble member and having a length such that, prior to arrival of said discharge port in by-passing relation to said outlet seal, said inner core portion engages the end wall of said thimble member and compresses its flange against said inlet valve seat in fluid sealing relation thereto, further inward movement of said core thereafter being permitted by extension of said thimble member to dispose said core dispensing port in the aforesaid by-passing relation to said outlet seal.

6. A metering valve as defined in claim 5, wherein said thimble member is provided with a port in its end wall, said port being disposed in axial alignment with said inner core portion and of smaller size than said portion whereby engagement of said inner core portion with said thimble wall closes said port therein.

7. A metering valve as defined in claim 5, wherein said housing inlet is formed to provide at least one groove in its side wall extending from a point beyond the closed end of said thimble member to and intersecting said annular inlet seat, the opening formed by the intersection of said groove and seat falling entirely inside the outer periphery of said seat.

8. A metering valve as defined in claim 5, wherein said housing is formed interiorly adjacent its inlet to provide at least one groove in the side wall of said metering chamber extending from a point within said chamber to a point beyond said inlet seat and intersecting said seat, the opening formed by the intersection of said groove and seat falling entirely outside the inner periphery of said seat.

9. A metering valve for self-pressurized fluid products comprising a housing having an inlet and an outlet, means for mounting said housing in the mouth of a container, said housing being formed interiorly about its inlet to provide an annular valve seat and a central depression encircled by said seat, at least one groove in the side wall of said central depression opening into said annular valve seat within the confines thereof, and a flexible disk overlying said annular seat and normally resting thereon of its own weight to form a check valve at said housing inlet, means for mounting said valve housing in the mouth of a container, and an elastic thimble-shaped member supported within said housing substantially concentrically therewith and in telescoping relation thereto above said housing inlet check valve, said thimble member defining a metering chamber and having an inlet communicating with the inlet of said housing member and an outlet concentric with said housing outlet for communicating said chamber to atmosphere, said resilient thimble member making sealing engagement circumferentially about said housing outlet, manually actuated means for releasing fluid from said chamber through said thimble and housing outlets comprising an axially reciprocable core located concentrically in said thimble member, a discharge port and associated fluid passage in said core for discharging to atmosphere fluid released from said chamber when said core is depressed, fluid seal means retained by said housing means and surrounding said core at said thimble and housing outlets and normally preventing escape of fluid product therefrom, means normally urging said core to a non-dispensing position relative to said outlet seal but yieldable upon manual depression of said core to move said discharge port into position to by-pass said seal and allow fluid in said chamber to escape through said core discharge port and passage to atmosphere, said core having an inner portion adapted to engage said thimble member interiorly thereof and close said normally open inlet prior to the arrival of said core discharge port at outlet seal by-passing position, further travel of said core to said last named position being permitted by elastic elongation of said thimble member.

10. A metering valve for self-pressurized aerosol fluid products comprising a tubular housing having a fluid inlet and a fluid outlet at respectively opposite ends, a rigid tubular sleeve forming an interior housing, said sleeve being telescopically received in the outlet end of said external housing and having a flange on its outlet end by which it is supported in said housing, said sleeve having an open inner end; a resilient thimble-shaped member encasing said sleeve externally thereof and having an open-ported end wall normally engaging the inner open of said sleeve, thimble member being peripherally clamped at its outlet end between said interior and exterior housing members; manually operated means for releasing to atmosphere fluid in said sleeve and thimble members and comprising a reciprocable core located concentrically in said sleeve member, a discharge port and associated fluid passage in said core for discharging to atmosphere fluid released from said chamber when said core is depressed; fluid seal means retained by said external housing means and surrounding said core at said thimble and housing outlets and normally preventing escape of fluid product therefrom, means normally urging said core to non-dispensing position relative to said outlet seal but yieldable upon manual depression of said core to move said discharge port into position to by-pass said seal and allow fluid in said chamber to escape through said core discharge port and passage to atmosphere, said core having an inner end terminating normally adjacent the inner end of said sleeve and adapted to engage said thimble member interiorly thereof to close the open port of said thimble member prior to the arrival of said core discharge port at outlet seal by-passing position, further travel of said core to said last named position being permitted by elastic elongation of said thimble member.

11. A metering valve as defined in claim 10, wherein the flange of said rigid sleeve member is formed with a reversely bent rim and said thimble member is formed with a peripheral flange at its open end which is disposed between said sleeve flange and said housing at the outlet end thereof, forming a fluid seal about said outlet.

References Cited by the Examiner
UNITED STATES PATENTS

| | | | |
|---|---|---|---|
| 2,073,112 | 3/37 | Lindinger | 251—333 |
| 2,643,799 | 6/53 | Countryman. | |
| 2,746,796 | 5/56 | St. Germain. | |
| 2,856,235 | 10/58 | Ward. | |
| 2,900,114 | 8/59 | Utz. | |
| 2,932,432 | 4/60 | Beard. | |
| 3,054,536 | 9/62 | Sagarin. | |
| 3,056,575 | 10/62 | Mooney | 251—333 X |
| 3,088,682 | 5/63 | Venus. | |
| 3,117,700 | 1/64 | Gorman. | |
| 3,123,261 | 3/64 | Gorman | 239—350 |

RAPHAEL M. LUPO, *Primary Examiner.*